US008949937B2

(12) United States Patent
Corda et al.

(10) Patent No.: US 8,949,937 B2
(45) Date of Patent: Feb. 3, 2015

(54) METHOD OF ACCESSING APPLICATIONS IN A SECURE MOBILE ENVIRONMENT

(75) Inventors: Alexandre Corda, Nice (FR);
Dominique Brule, Antibes (FR);
Mathew Smith, Antibes (FR)

(73) Assignee: NXP, B.V., Eindhoven (NL)

( * ) Notice: Subject to any disclaimer, the term of this patent is extended or adjusted under 35 U.S.C. 154(b) by 606 days.

(21) Appl. No.: 13/001,040

(22) PCT Filed: May 19, 2009

(86) PCT No.: PCT/IB2009/052073
§ 371 (c)(1),
(2), (4) Date: Jan. 17, 2011

(87) PCT Pub. No.: WO2009/156880
PCT Pub. Date: Dec. 30, 2009

(65) Prior Publication Data
US 2011/0113473 A1   May 12, 2011

(30) Foreign Application Priority Data

Jun. 24, 2008 (EP) .................................. 08104515

(51) Int. Cl.
*G06F 15/16* (2006.01)
*H04L 29/08* (2006.01)
(Continued)

(52) U.S. Cl.
CPC ................ *H04L 67/34* (2013.01); *G06Q 20/32* (2013.01); *G06Q 20/3227* (2013.01);
(Continued)

(58) Field of Classification Search
CPC .................................................. G06Q 20/00
USPC ........................................................ 726/3
See application file for complete search history.

(56) References Cited

U.S. PATENT DOCUMENTS 6,839,756 B1    1/2005  Boudou
7,240,362 B2 *  7/2007  Pfitzmann et al. ................. 726/2
(Continued)

FOREIGN PATENT DOCUMENTS

| JP | 2003032330 A | 1/2003 |
| WO | 2005/098769 A | 10/2005 |
| WO | 2007/068993 A | 6/2007 |

OTHER PUBLICATIONS

GSMA "Mobile NFC Technical Guidelines"; pp. 1-95 (Nov. 2007).
(Continued)

*Primary Examiner* — Krista M. Zele
*Assistant Examiner* — Esther Benoit

(57) ABSTRACT

A method of accessing in a mobile communication device (4) an application (5, 14, 26), the application (5, 14, 26) being issued by a Service Provider (2), from a trusted application, also known as wallet (12), in which mobile device (4) a secure element (7) such as a SmartMX device is comprised that comprises a service manager (8) that manages the application (5, 14, 26), comprising managing by the service manager (8) a link between the application (5, 14, 26) and an application-codec (6, 15) also being issued by the Service Provider (2), wherein the application-codec (6, 15) is designed for interfacing between the service manager (8) and the application (5, 14, 26) and for processing an access request requesting access to the application (5, 14, 26)received from the service manager (8) and triggered by the wallet (12), and, triggered by the wallet (12), accessing the application (5, 14, 26) via the service manager (8) by means of utilization of the link between the application (5, 14, 26) and the application-codec (6, 15), such that the application-codec (6, 15) linked with the respective application (5, 14, 26) performs accessing (23) the application (5, 14, 26) under control of the service manager (8).

20 Claims, 2 Drawing Sheets

(51) Int. Cl.
 *G06Q 20/32* (2012.01)
 *G06Q 20/34* (2012.01)
 *G07F 7/10* (2006.01)

(52) U.S. Cl.
 CPC ......... *G06Q 20/341* (2013.01); *G06Q 20/3552* (2013.01); *G06Q 20/3574* (2013.01); *G07F 7/1008* (2013.01); *H04L 67/02* (2013.01)
 USPC ............................................................ 726/3

(56) References Cited

U.S. PATENT DOCUMENTS

| | | | |
|---|---|---|---|
| 2004/0148362 A1* | 7/2004 | Friedman | 709/217 |
| 2007/0033330 A1 | 2/2007 | Sinclair et al. | |
| 2007/0136154 A1* | 6/2007 | Chung | 705/29 |
| 2007/0203969 A1 | 8/2007 | Wakasa | |
| 2007/0233615 A1* | 10/2007 | Tumminaro | 705/75 |
| 2007/0260615 A1* | 11/2007 | Shen | 707/100 |
| 2007/0293155 A1 | 12/2007 | Liao et al. | |
| 2008/0073426 A1* | 3/2008 | Koh et al. | 235/380 |
| 2008/0149734 A1* | 6/2008 | Musial et al. | 235/492 |
| 2008/0163247 A1 | 7/2008 | Musial | |
| 2008/0306849 A1* | 12/2008 | Johnson et al. | 705/35 |
| 2009/0261172 A1* | 10/2009 | Kumar et al. | 235/492 |
| 2009/0275364 A1 | 11/2009 | Morel | |
| 2011/0253781 A1 | 10/2011 | Matsuo | |

OTHER PUBLICATIONS

International Search Report for Application PCT/IB2009/052073 (Nov. 3, 2009).

Japanese Office Action in corresponding JP Application No. 2011-515674 (Translation Attached).

Indonesia Office Action issued in corresponding IN Application No. W-00201100302 (Translation Attached).

\* cited by examiner

METHOD OF ACCESSING APPLICATIONS IN A SECURE MOBILE ENVIRONMENT

FIELD OF THE INVENTION

The invention relates to a method of accessing in a mobile communication device an application from a trusted application, the mobile communication device comprising a secure element having a service manager that manages the application.

The invention further relates to a service manager computer program product designed to perform the method according to the first paragraph when executed on a computer.

The invention further relates to a secure element with an arithmetic logic unit and a memory, comprising a service manager computer product mentioned in the above paragraph.

The invention further relates to a mobile communication device for communication in a wireless communication network comprising a secure element as mentioned in the third paragraph.

The invention further relates to a Service Provider for issuing an application to be stored in a mobile communication device, the mobile communication device comprising a secure element having a service manager that is generally hindered from access to the application.

The invention further relates to a Trusted Application that constitutes a graphical user interface for the application, able to retrieve the list of applications installed in the secure element as well as to retrieve some information about those applications stored in a mobile communication device, as mentioned in the fifth paragraph above.

The invention further relates to a system comprising at least one mobile communication device according to the fourth paragraph and at least one Service Provider according to the preceding paragraph.

BACKGROUND OF THE INVENTION

There are mobile communication devices known which contain memory devices having unique memory device identifications, e.g. the MIFARE® classic family, developed by NXP Semiconductors, a contactless smart card IC operating in the 13.56 MHz frequency range with read/write capability. Recently, secure elements have been developed which are memory devices providing enhanced security features, particularly for the use in mobile phones and other mobile communication devices with Near Field Communication (NFC) capabilities. Said secure elements are also known as "Smard Cards". For a better understanding, a SmartMX device which is a leading representative of the secure elements will now be explained. SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

SmartMX architecture combines coprocessors for RSA, ECC, DES and AES and enables implementation of operating systems including Java Open Platform and MULTOS. The ability of SmartMX cards to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc.. A true anticollision method (acc. ISO/IEC 14443-3), enables multiple cards to be handled simultaneously.

In February 2007 the GSM Association (GSMA) published a white paper outlining operator community guidance for the eco-system parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service. Various different entities are involved in the Mobile NFC ecosystem. These are defined below:

Customer—uses the mobile device for mobile communications and Mobile NFC services. The customer subscribes to an MNO and uses Mobile NFC services.

Mobile Network Operator (MNO)—provides the full range mobile services to the Customer, particularly provides UICC and NFC terminals plus Over The Air (OTA) transport services.

Service Provider (SP)—provides contactless services to the Customer (SPs are e.g. banks, public transport companies, loyalty programs owners etc.).

Retailer/Merchant—service dependent, e.g. operates a NFC capable Point of Sales (POS) terminal.

Trusted Service Manager (TSM)—securely distributes and manages the Service Providers' services to the MNO customer base.

Handset, NFC Chipset and UICC Manufacturer—produce Mobile NFC/Communication devices and the associated UICC hardware.

Reader Manufacturer—produces NFC reader devices.

Application developer—designs and develops the Mobile NFC applications.

Standardisation Bodies and Industry Fora—develop a global standard for NFC, enabling interoperability, backward compatibility and future development of NFC applications and services.

One of the key findings in said white paper is that Mobile NFC will be successful provided that the Mobile NFC ecosystem is steady, providing value for all entities within it; and is efficient, by introducing a new role of the Trusted Service Manager.

The role of the Trusted Service Manager (TSM) is to:

Provide the single point of contact for the Service Providers to access their customer base through the MNOs.

Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

A characteristic feature of secure elements such as SmartMX cards is that they allow trusted applications (also known as Wallets or Trusted MIDlets) that are installed in a mobile communication device communicating with said secure element to securely manage NFC applications (coupons, tickets, . . . ) that are installed in the secure element of the mobile communication device with NFC capabilities. The Wallet can be said to constitute a graphical user interface for the NFC application. In order to accomplish this task, the Wallets are able to retrieve the list of NFC applications installed in the secure element as well as to retrieve some information about those NFC applications. However, several restrictions limit the accessibility of applications and application data, respectively. One of the restrictions is security consideration. Wallets are not located in the secure element of the mobile phone and as such are representing a security threat if information about the application formats would reside in the non-secure area of the memory of a mobile communication device. Because of this situation, there are limited access rights granted for such Wallets. This limits the ability to retrieve data to only a subset of the full set of application data. Another restriction is given by a practical consideration, which is the plurality of proprietary data formats introduced by the various Service Providers releasing the applications. Regarding this situation Wallet should always know the specific data format in advance in order to retrieve the application data accurately. It is virtually impossible that at any time all data formats introduced by all service providers are available because this would mean that each newly released data format must trigger an update of the Wallet. This updating is complicated and cumbersome for the end user and the wallet provider as well.

The potential security problems of Wallets emanating from the fact that they are located outside of the secure element could be circumvented by installing a service manager in the secure element with the ability to access the applications. However, the above mentioned restrictions caused by the plurality of proprietary data formats introduced by the various Service Providers releasing the applications also applies to the service manager. It is virtually impossible that at any time all data formats introduced by all service providers are implemented in a service manager and due to security reasons updating the service manager is even more complicated than updating a wallet. Therefore, in reality, the service manager is hindered to accessing all data of applications due to the multiple proprietary data formats.

Another restriction is that in order to update the data in an application the plurality of data formats means that the update mechanism OTA (over the air) from the TSM normally must work by replacing the complete application, rather than modifying a specific item of data inside the application.

OBJECT AND SUMMARY OF THE INVENTION

It is an object of the invention to provide a new method of accessing an application in a mobile device, the data contained within an application, a service manager computer program product for realizing said method when executed, a secure element comprising said service manger computer program product, a mobile device for communicating in a wireless communication network, a Service Provider for issuing an application to be stored in said mobile device and a system comprising at least one of said mobile devices and one of said Service Providers, in which the disadvantages defined above are avoided.

In order to achieve the object defined above, the present invention provides a method of accessing in a mobile communication device an application according to the features of claim 1.

In order to achieve the object defined above, with a service manager computer program product according to the invention characteristic features are provided so that such a service manager computer program product is directly loadable into a secure element with an arithmetic-logic unit and a memory, the computer program product comprising software code portions for performing the steps of the method according to the invention when said product is run on the secure element.

In order to achieve the object defined above, with a secure element according to the invention characteristic features are provided so that such a secure element comprises a service manager computer program product according to the invention.

In order to achieve the object defined above, the present invention provides a mobile communication device with the features of claim 9.

In order to achieve the object defined above, the present invention provides a Service Provider with the features of claim 10.

In order to achieve the object defined above, the present invention provides a system with the features of claim 11.

In order to achieve the object defined above, a trusted application of a mobile communication device constituting a graphical user interface for applications is provided, comprising the features of claim 13.

The characteristic features according to the invention provide the advantage that accessing the applications stored in a mobile communication device is channeled via the service manager and the application-codec stored in the secure element. This maintains robustness of the security model established by the secure element and overcomes security concerns, which would exist when accessing the applications from a wallet is performed without parsing the access via the service manager located in the secure element. Utilizing an application-codec further fosters the accessibility of the application while at the same time the design of the wallet can be kept simple and slim because all knowledge—in particular secret know how—necessary for accessing the applications can reside capsular in the application-codec within the secure element. In particular, allowing the service manager to manage the link between the application and the application-codec that is designed for accessing said application provides an additional aspect of maintaining the security model provided by the secure element while allowing certain flexibility in terms of usability of the application-codec.

In some embodiments of the invention the application and the application-codec linked to it is issued and sent to the mobile communication device and both are stored in the mobile communication device and a linking-record is generated indicating which codec is to be used when accessing the application. This solution guarantees transparence for the service manager in terms of usability of the codec while hiding the secret information relating to the application and also relating to the codec from all data processing activities taking place outside the secure element.

In another embodiment only the application and a link-indication indicating that an already existing application-codec shall be used for accessing the application is transmitted from the Service Provider to the mobile communication device. In this situation only the application is stored and a linking-record is generated that reflects that an already existing codec shall be used for accessing the application. This solution improves flexibility and allows re-use of an already existing codec, which also reduces memory space occupation by codecs while still maintaining the security model because the linking record is exclusively managed within the secure element.

In a further embodiment of the invention the distribution of the application and the application-codec or the link-indication of the already stored application-codec is performed by a Trusted Service Manager. This in terms of security guarantees that the secret data structure of the application and of the application-codec used for accessing the application remains secret because such Trusted Service Mangers are designed to avoid fraudulent interference with the data to be managed or distributed. Consequently, the underlying secret of the application or the access algorithms remain a secret property of the Service Provider issuing said application and application-codec.

In still a further embodiment of the invention utilization of a standardized interface in the service manger allows for a simple design of the wallet and full focus on user friendly interface implementation of the wallet while utilizing a common protocol that can be re-used from one wallet design to another wallet design. Consequently, from a wallet design point of view, accessing the application via the secure element becomes a totally transparent routine task.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1:
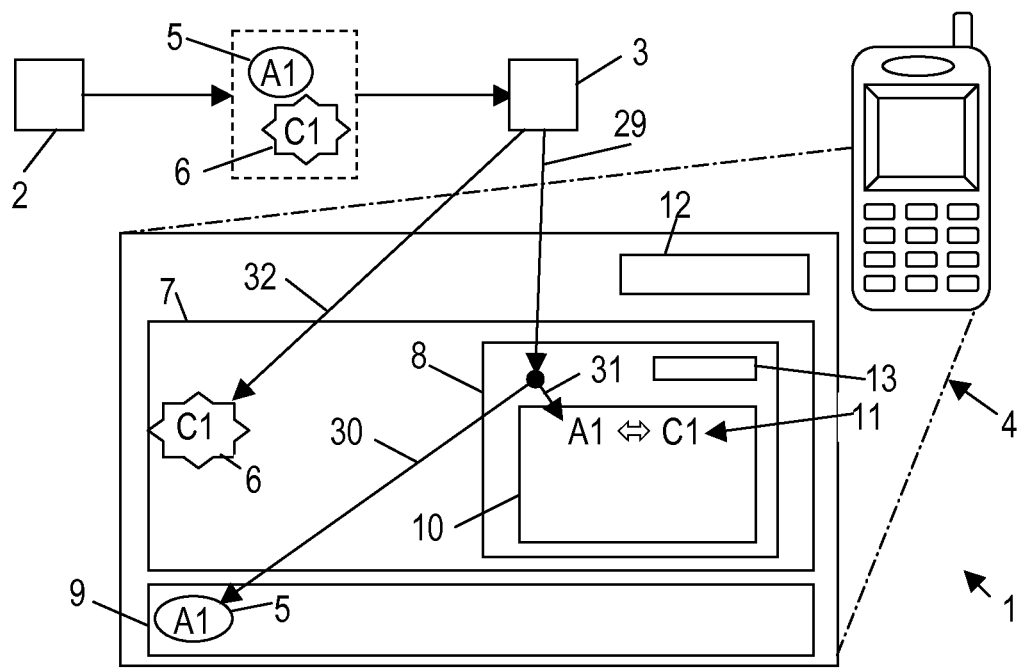
FIG. 1 shows one aspect of a first embodiment of the invention in form of a schematic block diagram illustrating an installation of an application.

FIG. 1 shows a schematic diagram of a telecommunication system, e.g. a Mobile NFC ecosystem as disclosed in the above referenced GSMA white book. The system 1 comprises a Service Provider 2, a Trusted Service Manager 3 and a mobile communication device 4. The Service Provider 2 communicates with the Trusted Service Manager 3 via the Internet by using e.g. the HTTP protocol. The Service Provider 2 issues a first application 5 and a first application-codec 6 and transmits both to the Trusted Service Manager 3.

Firstly, a process of installing various applications in the mobile communication device 4 is described. The application 5 can be of any type but for the completeness of this example a mobile ticketing application for public transport is concerned. The application-codec 6 is designed for accessing the application 5 when stored in the mobile communication device 4 as will be explained below in more details. Both, the application 5 and the application-codec 6, are communicated to the mobile device 4 via the Over-the-Air (OTA) services provided by a Mobile Network Operator, particularly via Short Message Service (SMS) services, and/or via a computer network and wireless services, e.g. NFC services. NFC terminals—not shown in the figures—for carrying out NFC services may be provided by the Mobile Network Operator. Similarly, the Trusted Service Manager 3 communicates with the mobile communication device 4 via an Over-The-Air service of a Mobile Network Operator, e.g. Short Message Service.

The mobile communication device 4 may e.g. be configured as a NFC mobile phone. It comprises a secure element 7 which is a memory device with enhanced security features that has its own computational power. The secure element 7 is advantageously configured as a SmartMX device that may comprise multiple interface options. SmartMX devices also comprise encryption coprocessors and enable implementation of operating systems including Java Operating Systems. The secure element 7 is adapted to contain NFC applications (coupons, tickets, etc.) that are provided by the Service Provider 2.

The mobile communication device 4 further comprises a service manager 8 located in the secure element 7. The service manger 8 is designed for managing applications and corresponding link-indication about application-codecs. In the mobile communication device 4 shown in FIG. 1 the service manger 8 receives the application 5 (see arrow 29) and stores it (see arrow 30) in accordance with its type in a MIFARE memory 9 of the mobile communication device 4. The MIFARE memory 9 is the application memory for MIFARE applications. In case of another type of application another memory or area of a memory would be concerned as application memory. The service manager 8 also receives the application-codec 6 (see arrow 32) and stores it in the secure element 7. The service manager 8 further stores (see arrow 31) in the secure element 7 in a linking-table 10 a first linking-record 11 that reflects the link between the first application 5 and its application-codec 6. The first application-codec 6 is designed for interfacing between the service manager 8 and the first application 9 and for processing access requests requesting access to the first application 5 received from the service manager 8.

Not only the application-codec 6 but in general such codecs are composed of two parts. The first part is a common codec interface, known to the service manager 8, such that the service manager 8 can call/use the codec easily and perform data/information exchange with it. The second part is determined by the specific implementation of the code relating to the application to by accessed, or in other words, relating to the service to be provided by the application and to be supported by the codec. This specific implementation allows the handling/accessing of the application. Concerning this second part the design of the first application-codec 6 comprises information relating to the application 5, its data structure and—if applicable—also algorithms for accessing, e.g. reading, writing or modifying data stored or represented by the application 5. These properties are necessary for booking tickets and for changing the balance according to the usage of the first application 5. Guided by this general two-part structure, the codecs are responsible for retrieving information from the applications, performing operations on the applications and for hiding the format of the applications from other instances of the mobile communication device, e.g. programs requesting information from the applications. In the present example such codecs are realized as JAVA software programs. However, in case of another operation system environment the realization might be based on a different programming language. Furthermore, the codecs do not have to be located in the secure element 7 as described in the context of the present example, but could also be located in another unit of the mobile communication device 4.

The mobile communication device 4 further contains a trusted application 12, also known as wallet, which manages NFC applications installed in the secure element 7, which is not shown in FIG. 1, as well as MIFARE applications in a MIFARE memory 9, as shown in FIG. 1 by means of the application 5. Particularly, the trusted application 8 is able to retrieve a list of applications installed in the secure element 7 and in the MIFARE memory 9 as well as to retrieve some information about those applications, e.g. the balance of tickets represented by the application 5. Frequently, the trusted application 12 is operated as a graphical user interface for said applications. In the present case, when activated, the trusted application 12 would show the existence of an application and e.g. a balance of tickets on a display of the mobile communication device 4, as will be explained in more details below.

In order to allow for a simple and reliable solution of communication between the trusted application 12 and the service manager 8, the service manager 8 comprises a standardized interface 13—also termed wallet application interface—that is designed for applying a common protocol in a communication with the wallet 12. In particular it allows the wallet 12 to request a list of applications installed and to request, e.g. the balance available for one of the stored applications by applying dedicated request commands. Upon receiving one of the commands supported by the interface 13, it passes the request to the service manager 8 for further processing, which will be explained in more details below.

Figure 2:
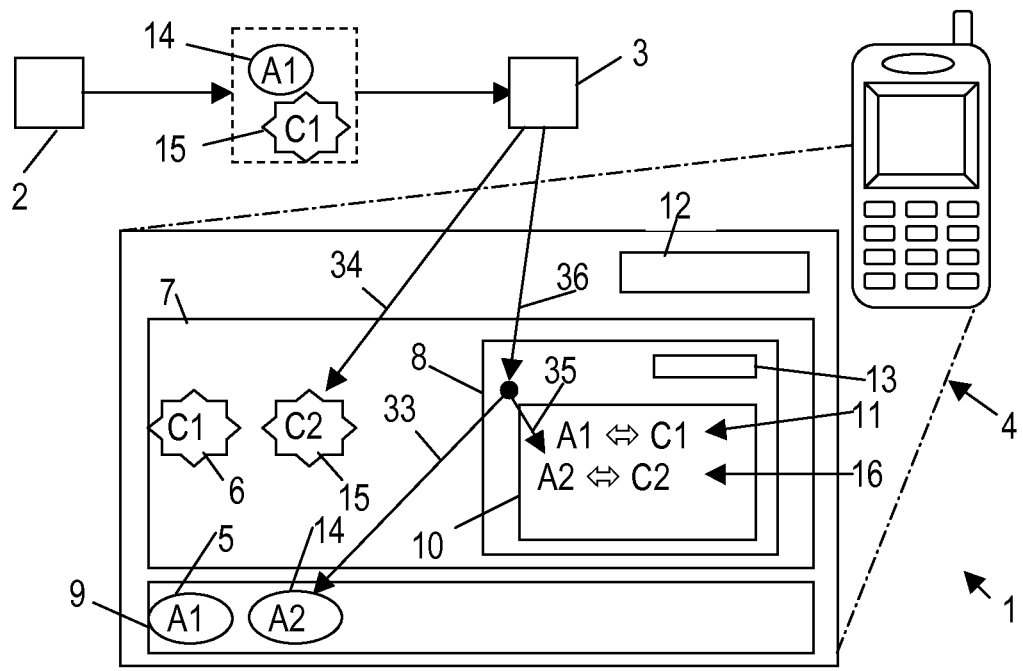
FIG. 2 shows another aspect of the embodiment depicted in FIG. 1 illustrating an installation of a further application.

In the following, reference is made to FIG. 2, which shows the installation process of a second application 14. According to this example the second application 14 represents e.g. pre-paid tickets to be used for accessing a restricted area. Similar to what is described in terms of FIG. 1, the Service Provider 2 issues the second application 14 and its application-codec 15 and transmits both via the Trusted Service Manager 3 to the mobile communication device 4 where both are received. The design of the second application-codec 15 follows the general design rules for codecs as elaborated above and is similar to the design of the first application-codec 6. The second application-codec 15 comprises information relating to the second application 14, its data structure and—if applicable—also algorithms for accessing, e.g. reading, writing or modifying data stored or represented by the second application 14. The Service Manager 8 receives (see arrow 36) the second application 14 and installs (see arrow 33) the second application 14 in the MIFARE memory 9. The service manager 8 further installs the received second application-codec 15 (see arrow 34) in the secure element 7. A new, second linking-record 16 is created (see arrow 35) in the linking-table 10. The second linking-record 16 represents that the second application-codec 15 is to be used when accessing the second application 14.

Figure 3:
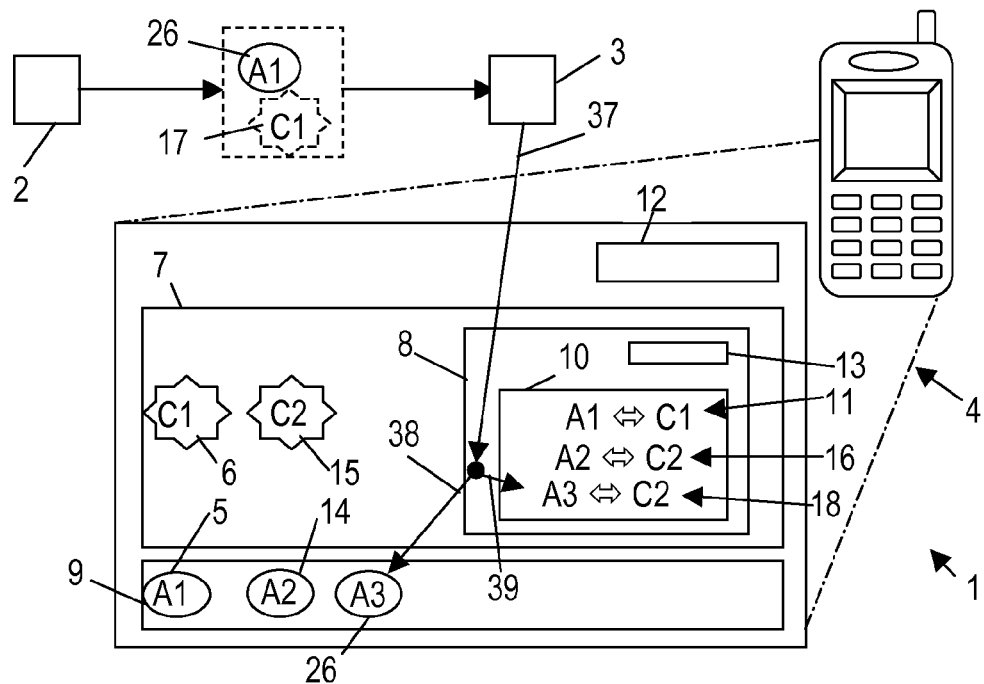
FIG. 3 shows a further aspect of the embodiment depicted in FIG. 1 illustrating an installation of a further application.

In a further aspect of the invention the installation of a third application 26 is concerned, which is shown in FIG. 3. The Service Provider 2 issues the third application 26. In contrast to what is explained in conjunction with FIG. 1 and FIG. 2, the Service Provider 2 does not issues a third application-codec but issues a link-indication 17 of an application-codec already stored in the secure element 7 and to be used for accessing the third application 26. In the present case the link-indication 17 forms part of the third application 26, but it might also be separated from the third application 26. The third application 26 together with the link-indication 17 is transmitted (see arrow 37) to the mobile communication device 4 in the common way as explained above. In contrast to the earlier explained examples of installing applications and application-codecs, only the third application 26 is stored (see arrow 38) in the application memory, which is the MIFARE memory 9. The service manager 8 generates (see arrow 39) a third linking-record 18 taking the link-indication 17 into account, such that for accessing the third application 26 the second application-codec 15 is to be used. By applying this procedure a two-fold advantage is achieved. On one hand data volume is reduced when transmitting the third application 26, while on the other hand efficiency of memory usage in the mobile communication device 4 is improved.

Figure 4:
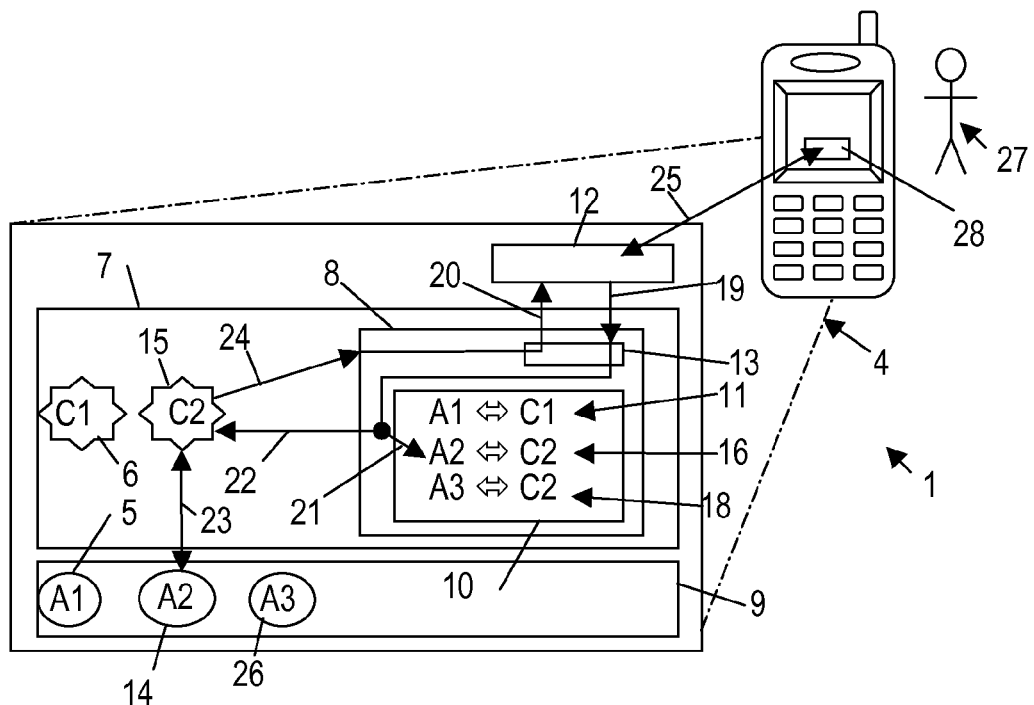
FIG. 4 shows a further aspect of the embodiment depicted in FIG. 1 illustrating accessing the installed applications.

In the following the method of accessing the applications 5, 14 and 26 is described by way of FIG. 4, which for the sake of clearness shows accessing only the second application 14 in details. A user 27 utilizing the mobile communication device 4 activates a menu item 28 displayed on the display of the device 4. The menu item 28 is part of the trusted application 12 as indicated by the arrow labeled by reference sign 25 and allows for requesting a balance of tickets represented by the second application 14. The trusted application 12 sets up a request 19 via the standardized interface 13 of the service manger 8 and waits for feedback 20 from the service manager 8 to be communicated via the standardized interface 13. The service manager 8 receiving the request 19 utilizes the linking table 10 (shown by reference sign 21) for identifying via the second linking-record 16 the second application-codec 15 to be used when accessing the second application 14. Following the identification of the second application-codec 15 this codec 15 is activated in the secure environment provided by the secure element 7 and the request 19 is passed over (shown by reference sign 22) to the second application-codec 15 where the request 19 is processed (shown by reference sign 23) by means of utilizing the inherent knowledge about the data structure represented by the second application 14 when accessing the second application 14. After inquiring the balance of tickets from the second application 14 the second application-codec 15 returns its result (shown by reference sign 24) to the service manager 8. The service manager 8 passes over the result to the trusted application 12. This is performed by utilizing the standardized interface 13 for communicating a feedback 20.

Similar to the above described method, the information relating to or represented by the third application 26 can be requested by a user 27. This process is not shown in details in FIG. 4. However, the service manger 8 receiving such a request would identify in the linking-table 10 that the second application-codec 15 is linked with the third application 26. This link is represented by the third linking-record 18. Similar to the above described method the second application-codec 15 would be activated by the service manager 8, but according to the present case for accessing the third application 26.

Summarizing the two examples of accessing the applications 5, 14 and 26, the method of accessing the applications 5, 14 and 16 comprises the step of managing by the service manager 8 a link between the application 5, 14 and 26 and the application-codec 6 and 15. When triggered by the request 19 of the wallet 12, the method further comprises the step of accessing the application 5, 14 and 26 via the service manager 8 by means of utilization of said managed link, such that the application-codec 6 or 15 linked with the respective application 5, 14 or 26 performs accessing the application 5, 14 or 26 under control of the service manager 8. This method allows preserving the security model provided by the secure element 7 while at the same time making the applications 5, 14 and 26 easily accessible for the wallet 12.

It is to note that although only one Service Provider 2, only one Trusted Service Manger 3 and only one mobile communication device 4 are shown in the present examples, the scope of the invention shall not be limited to such number and the concept of the invention shall also be applicable to a plurality of such entities 2, 3 and 4 or a plurality of types of applications.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method comprising:
   managing, by a service manager in a mobile communication device, a link between an application and an assigned application-codec installed in a secure element, wherein the assigned application-codec comprises an interface between the service manager and an application that translates application access requests received from the service manager which are format invariant;
   processing the translated application access requests;
   returning the processed application access requests to the service manager;
   triggering, with a wallet, the returned application access requests;
   retrieving, with the service manager, the application-codec assigned to a respective application by utilizing the link between the application and the application-codec;
   sending the triggered application access requests to the retrieved application-codec linked with the respective application; and
   returning results delivered by the application-codec to the wallet.

2. The method as claimed in claim 1, further comprising:
   receiving, via a wireless communication network from a Service Provider, the application and a link-indication about an application-codec to be used for accessing the received application,
   storing the received application in an application memory of the mobile communication device, and
   generating, in the secure element, a linking-record that reflects the link between the application and the assigned application-codec based on the received link-indication.

3. The method as claimed in claim 2, further comprising:
   receiving, with a Trusted Service Manager from the Service Provider, the application, an application-codec assigned to the application, and a link-indication about an application-codec assigned to the application; and
   submitting, with the Trusted Service Manager, the received application and the received link-indication to the service manager.

4. The method as claimed in claim 2, further comprising:
   installing, with the Trusted Service Manager, the application-codec in the secure element of the mobile communication device.

5. The method as claimed in claim 1, further comprising:
   performing communication between the wallet and the service manager via a standardized interface that is configured for applying a common protocol in a communication with the wallet.

6. A service manager computer program product embodied upon a non-transitory computer-readable medium that is directly loadable into a secure element with an arithmetic-logic unit and a memory, comprising software code portions for performing the steps of claim 2 when said service manager computer program product is run on the secure element.

7. The method of claim 1, wherein the secure element is configured as a SmartMX device.

8. A mobile communication device configured for communication in a wireless communication network comprising:
   an application issued by a Service Provider; and
   a wallet; and
   a secure element, the secure element having a service manager that manages the issued application;
   an application-codec that is configured for interfacing between the service manager and the issued application and processing access requests requesting access to an application received from the service manager and triggered by the wallet; and the service manager is configured for managing a link between the application and an application-codec issued by the Service Provider and requesting access to the application by utilization of a link between the application and the application-codec, such that the application-codec when linked with a respective application is configured to access the respective application.

9. A Service Provider configured for issuing an application to be stored in a mobile device, the mobile device comprising a wallet, and a SmartMX device having a service manager configured to manage the application, wherein the Service Provider is configured for processing an access request requesting access to an application received from the service manager, and issuing a link-indication about an application-codec to be used for accessing the application, wherein the application codec is configured for interfacing between the service manager and the received application.

10. A system comprising at least one mobile communication device according to claim 8.

11. The system as claimed in claim 10, comprising:
   a Trusted Service Manager which is configured for receiving, from the Service Provider via a computer network, the application, the application-codec, and a link-indication about an application-codec assigned to the received application, submitting the received application and the received link-indication to the service manager, and installing the received application-codec in the secure element of the mobile communication device.

12. A trusted application of a mobile communication device constituting a graphical user interface for applications, wherein the trusted application is configured to retrieve a list of applications installed in an application memory of the mobile communication device as well as to retrieve information about the installed applications by triggering the service manager computer program product according to claim 6, which is loaded into a secure element of the mobile communication device.

13. The method of claim 1, further comprising:
   managing, with the wallet, both NFC applications and MIFARE applications.

14. The method of claim 1, further comprising:
operating the wallet as a graphical user interface.

15. The mobile communication device of claim 8, wherein the wallet is configured to manage both NFC applications and MIFARE applications.

16. The mobile communication device of claim 8, wherein the wallet is configured to operate as a graphical user interface.

17. The mobile communication device of claim 8, wherein the service manager is configured to receive the application-codec and store the received application codec in the secure element.

18. The mobile communication device of claim 8, wherein the service manager is configured to store a linking record that reflects a link between a first application and a respective application codec in the secure element.

19. The mobile communication device of claim 8, wherein the service manager is configured to receive a link indication from the Service Provider in lieu of an already received application codec.

20. The mobile communication device of claim 8, wherein the service manager is configured to generate a linking record based upon a link indication that corresponds to an already received application codec.

* * * * *